US008608243B2

(12) United States Patent
Maeda et al.

(10) Patent No.: US 8,608,243 B2
(45) Date of Patent: Dec. 17, 2013

(54) VEHICLE SEAT

(75) Inventors: Michitaka Maeda, Toyota (JP); Naoki Takada, Nissin (JP); Masato Oguri, Toyota (JP); Masahiro Sanou, Toyota (JP); Kazuyoshi Fujisaka, Toyota (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 510 days.

(21) Appl. No.: 12/851,821

(22) Filed: Aug. 6, 2010

(65) Prior Publication Data
US 2011/0068611 A1    Mar. 24, 2011

(30) Foreign Application Priority Data

Sep. 24, 2009  (JP) .................................. 2009-218925

(51) Int. Cl.
*B60N 2/66* (2006.01)
(52) U.S. Cl.
USPC .................. 297/284.4; 297/217.3; 297/284.6
(58) Field of Classification Search
USPC .......... 297/284.4, 284.6, 217.1, 217.3, 284.8
See application file for complete search history.

(56) References Cited

U.S. PATENT DOCUMENTS

| 5,352,018 | A  | * | 10/1994 | Arakawa et al. | 297/284.4 |
| 6,663,177 | B2 | * | 12/2003 | Blanco et al. | 297/284.2 |
| 6,682,494 | B1 | * | 1/2004 | Sleichter et al. | 601/57 |
| 6,918,884 | B2 | * | 7/2005 | Knelsen et al. | 601/57 |
| 7,083,232 | B2 | * | 8/2006 | Frank | 297/284.4 |
| 7,488,039 | B2 | * | 2/2009 | Fischer et al. | 297/284.4 |
| 7,575,278 | B2 | * | 8/2009 | Wissner et al. | 297/284.4 |
| 7,727,171 | B2 | * | 6/2010 | Ozaki et al. | 601/105 |
| 8,162,398 | B2 | * | 4/2012 | Colja et al. | 297/284.4 |
| 2009/0189423 | A1 | * | 7/2009 | Chi | 297/217.3 |
| 2009/0227913 | A1 |   | 9/2009 | Moriyama et al. |  |

FOREIGN PATENT DOCUMENTS

| JP | 5-82341 | 11/1993 |
| JP | 2005-87604 | 4/2005 |
| JP | 2006-198070 | 8/2006 |

OTHER PUBLICATIONS

Japan Office action, dated Apr. 10, 2013 along with an english translation thereof.

* cited by examiner

*Primary Examiner* — David Dunn
*Assistant Examiner* — Tania Abraham
(74) *Attorney, Agent, or Firm* — Greenblum & Bernstein P.L.C.

(57) ABSTRACT

A vehicle seat includes: a holder assembled to a back frame, the holder configured to receive a backrest load of a seated person via a pad member; a vibration device assembled to a rear side of the holder, the vibration device configured to give a local stimulus to a seated person's waist; an air massage device disposed in a through hole formed in a thickness direction of the pad member, the air massage device configured to locally press a seated person's back; and a lumbar support device configured to change a projecting amount of a receiving surface of a seat back, wherein the lumbar support device has a rod configured to be movable between an advancing position and a retreating position to change the projecting amount of the receiving surface of the seat back, and wherein the rod is disposed between the holder and the vibration device.

4 Claims, 3 Drawing Sheets

VEHICLE SEAT

CROSS REFERENCE TO RELATED APPLICATION

The present application claims priority from Japanese Patent Application No. 2009-218925, which was filed on Sep. 24, 2009, the disclosure of which is herein incorporated by reference in its entirety.

TECHNICAL FIELD

The apparatuses and devices consistent with the present invention relate to a vehicle seat, and particularly, to a vehicle seat including a vibration device which gives a local stimulus to a seated person's waist, and an air massage device which locally presses a seated person's back.

BACKGROUND

In order to refresh a seated person, vehicle seats including various kinds of devices are proposed. Here, the following Patent Document 1 discloses a vehicle seat including a vibration device which gives a local stimulus to a seated person's waist, and an air massage device which locally presses a seated person's back. Since a seated person can be relaxed by activating these devices, the degree of fatigue resulting from prolonged seating of the seated person can be reduced.
[Patent Document 1] JP-A-2006-198070

SUMMARY

However, in the above-described Patent Document 1, for example, when a lumbar support device in which a rod supporting a seated person's waist is turned with respect to a back frame is provided behind the vibration device, the rod pushes out the vibration device. Therefore, there is a risk that the vibration device may be damaged by this pushing out. In order to prevent this, a lumbar support device that is provided at a position excluding the vibration device can also be considered. In that case, however, there is a risk that the function of supporting a seated person's waist may deteriorate.

The invention is intended to solve such problems, and the object thereof is to provide a vehicle seat that can prevent damaging a device which gives a local stimulus to a seated person's waist and without deteriorating the function of supporting a seated person's waist.

According to an illustrative aspect of the present invention, there is provided a vehicle seat comprising: a holder that is assembled to a back frame, the holder configured to receive a backrest load of a seated person via a pad member; a vibration device that is assembled to a rear side of the holder, the vibration device configured to give a local stimulus to a seated person's waist; an air massage device that is disposed in a through hole formed in a thickness direction of the pad member, the air massage device configured to locally press a seated person's back; and a lumbar support device that is configured to change a projecting amount of a receiving surface of a seat back for a seated person's waist, wherein the lumbar support device has a rod that is configured to be movable between an advancing position and a retreating position to change the projecting amount of the receiving surface of the seat back, and wherein the rod is disposed between the holder and the vibration device so that the receiving surface of the seat back is projected when the rod pushes out the holder and the pad member in which the air massage device is attached while moving to the advance position.

According to another illustrative aspect of the present invention, there is provided a vehicle seat comprising: a frame; a pad member that is assembled to the frame, the pad member having a receiving surface, a back surface and a through hole; a holder that is assembled to the frame and disposed on the back surface of the pad member, the holder configured to receive a load of a seated person via the pad member; a vibration device that is assembled to a rear side of the holder, the vibration device configured to give a vibration to a seated person; an air massage device that is disposed in the through hole formed in the pad member, the air massage device configured to press a seated person; and a lumbar support device that is configured to change a projecting amount of the receiving surface of the pad member, wherein the lumbar support device has a rod that is configured to be movable between an advancing position and a retreating position to change the projecting amount of the receiving surface of the pad member, and wherein the rod is disposed between the holder and the vibration device, the receiving surface of the pad member is projected when the rod pushes out the holder and the pad member in which the air massage device is attached while moving from the retreating position to the advance position.

BRIEF DESCRIPTION OF THE DRAWINGS

Illustrative aspects of the invention will be described in detail with reference to the following figures wherein.

DETAILED DESCRIPTION OF EXEMPLARY EMBODIMENTS OF THE PRESENT INVENTION

Figure 1:
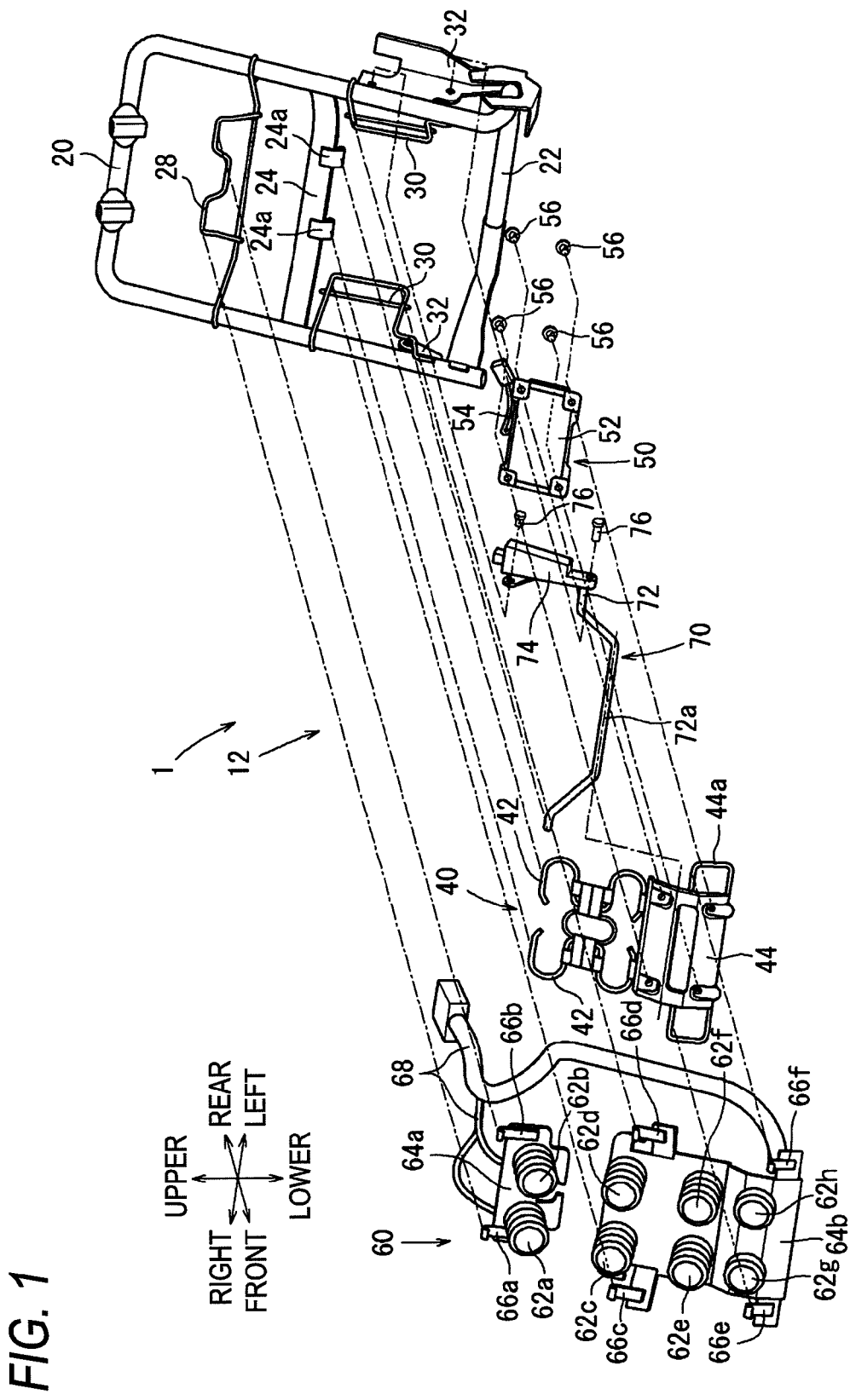
FIG. 1 is an exploded perspective view of a frame of a seat back in a vehicle seat according to an exemplary embodiment of the invention.
Figure 2:
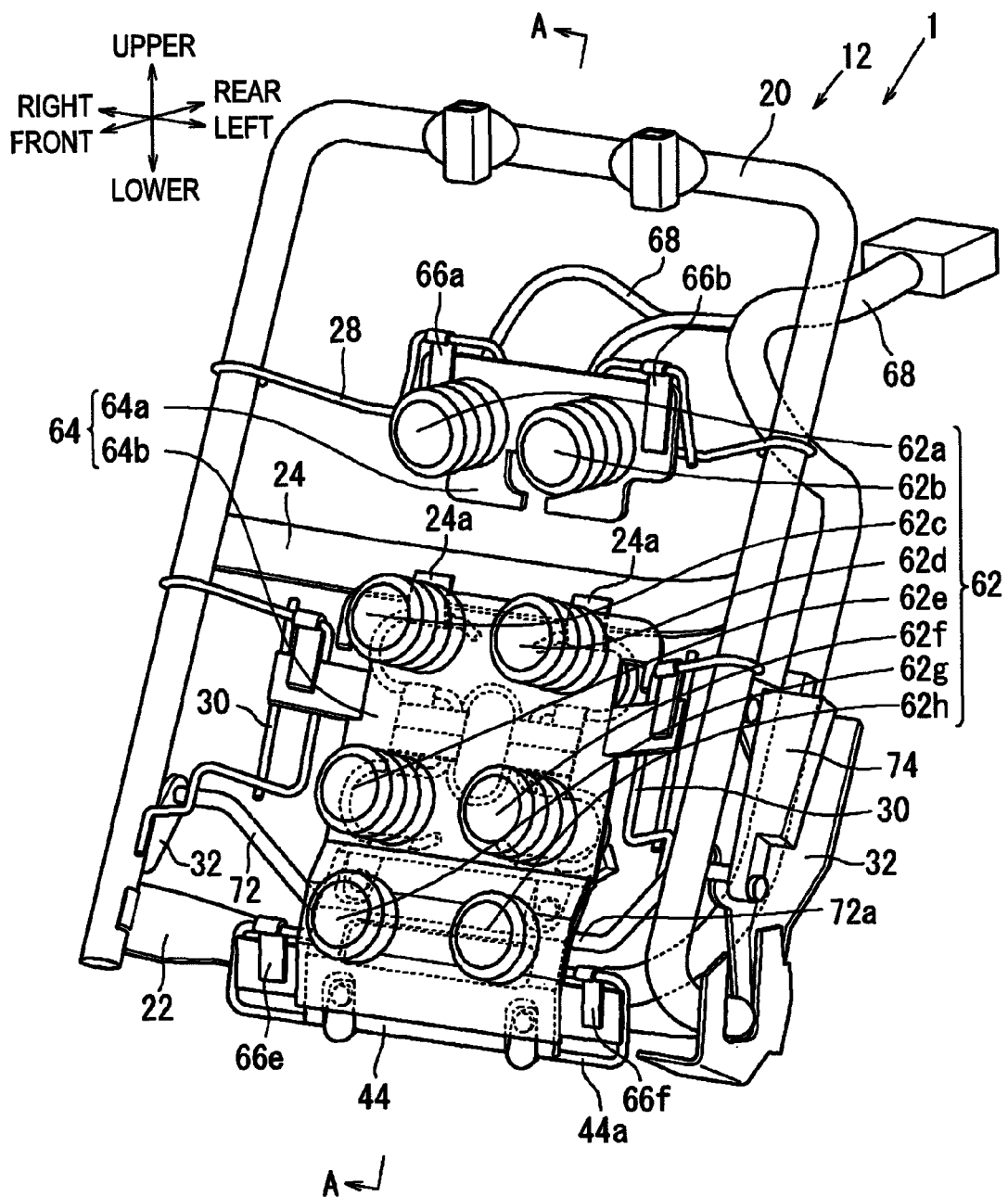
FIG. 2 is a perspective view showing an assembled state of FIG. 1.

Hereinafter, an exemplary embodiment for carrying out the invention will be described with reference to FIGS. 1 to 3. In addition, in FIGS. 1 to 2, in order to show the internal structure of a vehicle seat 1 clearly, the cushion structure (pad member 26) and skin structure are omitted, and only the internal frame structure is shown. Similarly to this, in FIG. 3, the skin structure is omitted, and the internal cushion structure and frame structure are shown. Additionally, in the following description, upper, lower, front, rear, left, and right indicate upper, lower, front, rear, left, and right directions described in the above-described respective drawings, i.e., upper, lower, front, rear, left, and right directions with reference to the vehicle seat 1.

First, the construction of the vehicle seat 1 according to the exemplary embodiment of the invention will be described with reference to FIGS. 1 to 3. This vehicle seat 1 is, for example, a driver's seat of an automobile, etc. and has a seat cushion 10, a seat back 12, and a headrest (not shown).

The internal structure of the seat back 12 among the seat cushions 10, the seat back 12, and the headrest will be described in detail. The internal structure of the seat back 12 includes a substantially U-shaped back frame 20 which forms the outline of the seat back 12, a lower frame 22 which bridges both free ends (both lower ends in FIG. 1) of the back frame 20, and a middle frame 24 which bridges substantially the center of the back frame 20 in the height direction in parallel with this lower frame. In addition, since the internal structures of the seat cushion 10 and the headrest are well-known structures, the detailed description thereof will be omitted.

A supporting wire 28 which bridges the right and left of the back frame is assembled to the back frame 20 at a position above the middle frame 24. Supporting wires 30 and 30 are also assembled to the lower right and left, respectively, of the back frame 20. The backrest load of a seated person via the pad member 26 can be elastically received by the supporting wires 28 and 30. Additionally, attachment brackets 32 and 32 for assembling a lumbar support device 70, which will be described later, are anchored to the right and left of the back frame 20.

The seat back 12 is provided with a holder 40, a vibration device 50, an air massage device 60, and the lumbar support device 70. These parts 40, 50, 60, and 70 will be individually described.

First, the holder 40 will be described. The holder 40 has substantially S-shaped bent springs 42 and 42 formed on the right and left so as to make a pair, and holding plates 44 hooked on one ends (lower ends in FIG. 1), respectively, of both the bent springs 42. A substantially rectangular holding wire 44a is hooked on the back of the holding plate 44.

The other ends (upper ends in FIG. 1) of both the bent springs 42 are respectively hooked on right and left hooks 24a and 24a which are anchored to the middle frame 24. The backrest load of a seated person (particularly, the backrest load from a seated person's waist) can be received by the holder 40. The holder 40 is constructed in this way.

Next, the vibration device 50 will be described. The vibration device 50 has a well-known vibration unit 52 which generates vibration. The vibration unit 52 is electrically connected to a control device (not shown) via a cable 54. Also, the vibration unit 52 is assembled to the back of the holding plate 44 of the holder 40 via screws 56.

A local stimulus can be given to a seated person's waist by activating the vibration unit 52 assembled in this way. In addition, the vibration unit 52 is electrically constructed so as to operate via a control device by the operation of a switch (not shown) from a seated person. The vibration device 50 is constructed in this way.

Next, the air massage device 60 will be described. The air massage device 60 includes a well-known air bag 62 which can be expanded and contracted, and a well-known base plate 64 to which the air bag 62 is attached. The base plate 64 is assembled to the back frame 20 side via a hook 66 so that the air bag 62 is arranged in a through hole 26a formed so as to pass through the pad member 26 in the thickness direction.

When the air bag 62 is expanded by the air supplied from an air supply suction device (not shown) connected to the air bag 62 via a hose 68, a seated person's back can be pressed by this expansion pressure. Conversely, when the air bag 62 is contracted by sucking the air into the air bag 62, the pressing on a seated person's back can be released. By repeating this supply suction, the above-described pressing state and a state in which pressing has been released can be repeated, and a seated person's back can be massaged. In addition, this supply and suction is electrically constructed so as to operate via a control device upon the operation of a switch (not shown) by a seated person.

In the exemplary embodiment, the air massage device 60 includes a first base plate 64a to which one set of air bags 62a and 62b is attached, and a second base plate 64b to which three sets of air bags 62c, 62d, 62e, 62f, 62g, and 62h are attached. The first base plate 64a is hooked on the supporting wire 28 via right and left hooks 66a and 66b. Similarly to this, the second base plate 64b is hooked on the right and left supporting wires 30 and 30 and the holding wire 44a via hooks 66c, 66d, 66e, and 66f at four corners. The air massage device 60 is constructed in this way.

Finally, the lumbar support device 70 will be described. The lumbar support device 7 includes a rod 72 which has a pressing portion 72a formed substantially in a crank shape, and a driving unit 74 with which one end (a left end in FIG. 1) of the rod 72 is mechanically coupled. The driving unit 74 includes a motor (not shown) which is a driving source, and a speed reducer (not shown) which transmits the driving force of the motor to the rod 72. This motor is electrically connected to the control device via a cable (not shown).

The lumbar support device 70 is assembled to the back frame 20 so that the other end (right end in FIG. 1) of the rod 72 is inserted into the right attachment bracket 32, and the driving unit 74 is anchored to the left attachment bracket 32 via bolts 76 and 76. Thereby, the rod 72 can be turnably supported on the back frame 20. At this time, the lumbar support device 70 is attached to the back frame 20 so that the rod 72 can push out the holding plate 44 of the holder 40 forward in a state where the device is arranged between the holder 40 and the vibration device 50.

Figure 3:
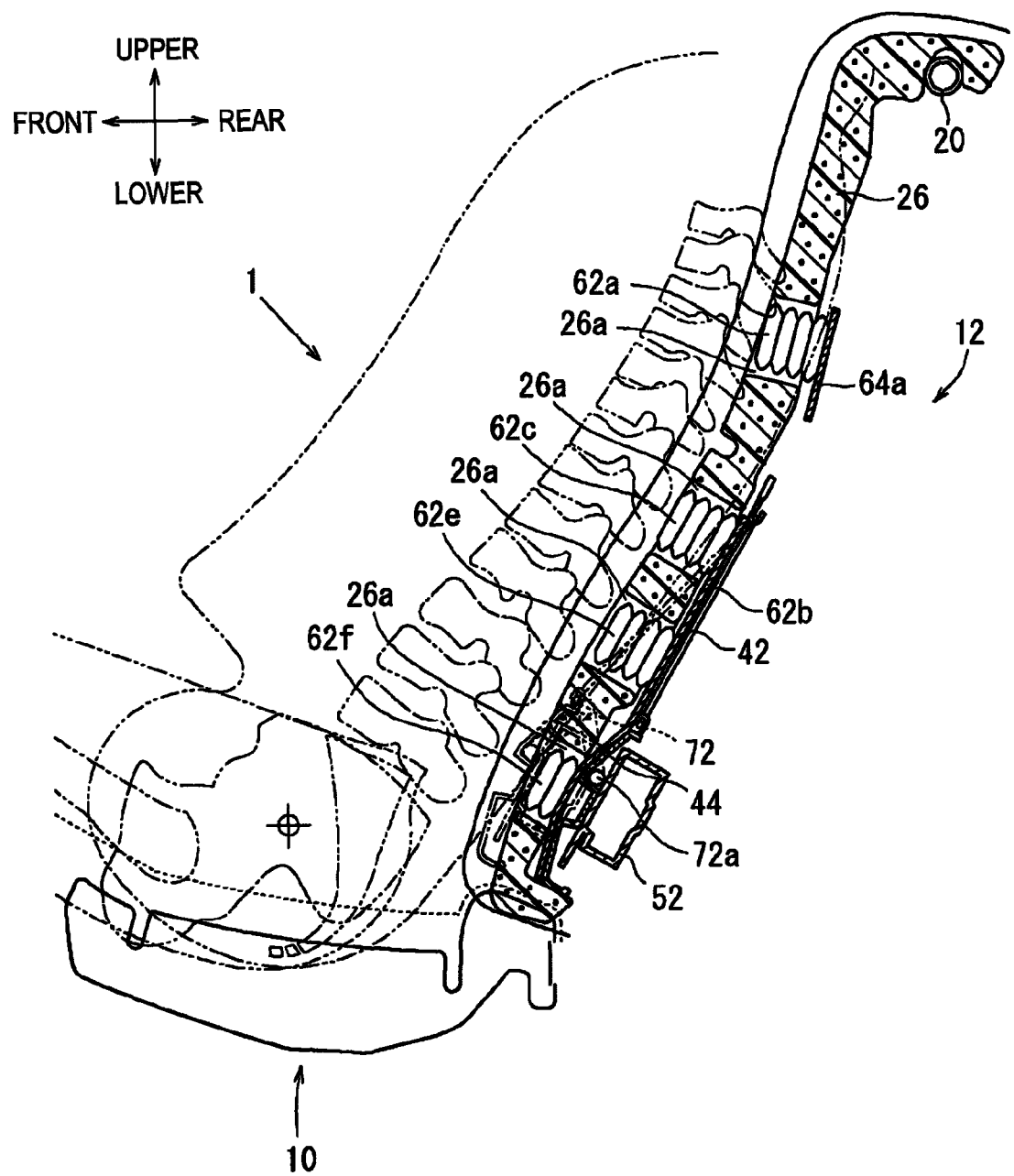
FIG. 3 is a sectional view taken along a line A-A of FIG. 2.

When a motor is driven to turn the rod 72 (when the rod 72 is brought into a state shown by an imaginary line from a state shown by a solid line, in FIG. 3), a seated person's waist (particularly, a pelvic part) can be pressed by the turning pressure from the pressing portion 72a. That is, when a motor is driven to turn the rod 72, the pressing portion 72a pushes out the holding plate 44 of the holder 40, and pushes out the pad member 26 in which the air massage device 60 is arranged, so that a receiving surface of the seat back 12 can be projected.

Conversely, when the turning of the rod 72 is returned (when the rod 72 is brought into the state shown by the solid line from the state shown by the imaginary line, in FIG. 3), the pressing against a seated person's waist can be released. That is, when the turning of the rod 72 is returned, the projection of the receiving surface of the seat back 12 can be released. By activating the lumbar support device 70 in this way, a seated person's waist can be supported (the burden on the waist can be reduced).

These descriptions correspond to "a lumbar support device includes a rod capable of advancing and retreating to change the projecting amount of the receiving surface of a seat back" as defined in the claims. In addition, this turning is electrically constructed so as to operate via a control device upon the operation of a switch (not shown) by a seated person. The lumbar support device 70 is constructed in this way.

The vehicle seat 1 according to the exemplary embodiment of the invention is constructed as described above. According to this construction, it is possible to activate the vibration device 50 to give a local stimulus to a seated person's waist, and it is also possible to activate the lumbar support device 70 (turn the rod 72 of the lumbar support device 70) to support a seated person's waist. At this time, even if the rod 72 is turned, since the rod 72 does not push out the vibration device 50 (since the vibration device 50 is arranged behind the rod 72), there is no risk that the vibration device 50 may be damaged. Accordingly, the vehicle seat can be used with no danger of damaging the vibration device 50 and without deteriorating the function of the lumbar support device.

Additionally, according to this construction, when the lumbar support device 70 is actuated, the rod 72 presses the back of the holding plate 44 of the holder 40. Therefore, the rod 72 presses a seated person's waist by face contact via the holding plate 44. Accordingly, the rod 72 can be prevented from pressing a seated person's waist strongly. Additionally, even if the air massage device 60 receives the backrest load from a seated person, the received load can be received by both bending springs 42. Accordingly, since the load can be elastically received, the seated person's comfort can be improved.

The above-described contents all relate to one exemplary embodiment of the invention, and it is not meant that the invention is not limited to the above contents. In the embodiment, a driver's seat of an automobile, etc. has been described as an example of the vehicle seat. However, the vehicle seat is not limited thereto, and may be a passenger seat, a backseat, etc.

According to a first aspect of the exemplary embodiment of the present invention, there is provided a vehicle seat comprising: a holder that is assembled to a back frame, the holder configured to receive a backrest load of a seated person via a pad member; a vibration device that is assembled to a rear side of the holder, the vibration device configured to give a local stimulus to a seated person's waist; an air massage device that is disposed in a through hole formed in a thickness direction of the pad member, the air massage device configured to locally press a seated person's back; and a lumbar support device that is configured to change a projecting amount of a receiving surface of a seat back for a seated person's waist, wherein the lumbar support device has a rod that is configured to be movable between an advancing position and a retreating position to change the projecting amount of the receiving surface of the seat back, and wherein the rod is disposed between the holder and the vibration device so that the receiving surface of the seat back is projected when the rod pushes out the holder and the pad member in which the air massage device is attached while moving to the advance position.

According to the first aspect, it is possible to activate the vibration device to give a local stimulus to a seated person's waist, and it is also possible to turn the lumbar support device (activate the rod of the lumbar support device) to support a seated person's waist. At this time, even if the rod is turned, since the rod does not push out the vibration device (since the vibration device is arranged behind the rod), there is no risk that the vibration device may be damaged. Accordingly, the vehicle seat can be used with no danger of damaging the vibration device and without deteriorating the function of the lumbar support device.

According to a second aspect of the exemplary embodiment of the present invention, the holder includes a wire member and a plate-like member that is hooked on the wire member, and the lumbar support device is disposed so that the rod can press the back of the plate-like member.

According to the second aspect, the rod has a shape which presses a seated person's waist by face contact via the plate-like member. Accordingly, the rod can be prevented from pressing a seated person's waist strongly. Additionally, even if the air massage device receives the backrest load from a seated person, the received load can be received by the wire member. Accordingly, since the load can be elastically received, seated person's comfort can be improved.

According to a third aspect of the exemplary embodiment of the present invention, there is provided a vehicle seat comprising: a frame; a pad member that is assembled to the frame, the pad member having a receiving surface, a back surface and a through hole; a holder that is assembled to the frame and disposed on the back surface of the pad member, the holder configured to receive a load of a seated person via the pad member; a vibration device that is assembled to a rear side of the holder, the vibration device configured to give a vibration to a seated person; an air massage device that is disposed in the through hole formed in the pad member, the air massage device configured to press a seated person; and a lumbar support device that is configured to change a projecting amount of the receiving surface of the pad member, wherein the lumbar support device has a rod that is configured to be movable between an advancing position and a retreating position to change the projecting amount of the receiving surface of the pad member, and wherein the rod is disposed between the holder and the vibration device, the receiving surface of the pad member is projected when the rod pushes out the holder and the pad member in which the air massage device is attached while moving from the retreating position to the advance position.

According to a fourth aspect of the exemplary embodiment of the present invention, the holder includes a wire member and a plate-like member that is hooked on the wire member, and the rod presses the plate-like member to push out the holder and the pad member when the rod moves from the retreating position to the advance position.

According to a fifth aspect of the exemplary embodiment of the present invention, the air massage device includes an air bag that is configured to be inserted in the through hole formed in the pad member.

According to a sixth aspect of the exemplary embodiment of the present invention, the rod is configured to rotate from the retreating position to the advance position to push out the holder and the pad member.

What is claimed is:

1. A vehicle seat comprising:
   a holder that is assembled to a back frame, the holder configured to receive a backrest load of a seated person via a pad member;
   a vibration device that is assembled to a rear side of the holder, the vibration device configured to give a local stimulus to a seated persons waist;
   an air massage device that is disposed in a through hole formed in a thickness direction of the pad member, the air massage device configured to locally press a seated persons back; and
   a lumbar support device that is configured to change a projecting amount of a receiving surface of a seat back for a seated persons waist,
   wherein the lumbar support device has a rod that is rotatable between an advancing position and a retreating position to change the projecting amount of the receiving surface of the seat back,
   wherein the rod is disposed between the holder and the vibration device so that the receiving surface of the seat back is projected when the rod pushes out the holder and the pad member in which the air massage device is attached while moving to the advance position, and
   wherein the holder includes a wire member and a plate-like member that is hooked on the wire member, and the lumbar support device is disposed so that the rod can press the back of the plate-like member.

2. A vehicle seat comprising:
   a frame;
   a pad member that is assembled to the frame, the pad member having a receiving surface, a back surface and a through hole;
   a holder that is assembled to the frame and disposed on the back surface of the pad member, the holder configured to receive a load of a seated person via the pad member;
   a vibration device that is assembled to a rear side of the holder, the vibration device configured to give a vibration to a seated person;
   an air massage device that is disposed in the through hole formed in the pad member, the air massage device configured to press a seated person; and a lumbar support device that is configured to change a projecting amount of the receiving surface of the pad member, wherein the lumbar support device has a rod that is rotatable between an advancing position and a retreating position to change the projecting amount of the receiving surface of the pad member, wherein the rod is disposed between the holder and the vibration device, the receiving surface of the pad member is projected when the rod pushes out the holder and the pad member in which the air massage device is attached while moving from the retreating position to the advance position, and wherein the holder includes a wire member and a plate-like member that is hooked on the wire member, and the rod presses the plate-like member to push out the holder and the pad member when the rod moves from the retreating position to the advance position.

3. The vehicle seat according to claim 2, wherein the air massage device includes an air bag that is configured to be inserted in the through hole formed in the pad member.

4. The vehicle seat according to claim 2, wherein when the rod rotates from the retreating position to the advance position the holder and the pad member are pushed outward.

* * * * *